(12) United States Patent
Miyai

(10) Patent No.: US 12,345,602 B2
(45) Date of Patent: Jul. 1, 2025

(54) ABNORMAL NOISE ANALYSIS DEVICE AND METHOD

(71) Applicant: TOYOTA JIDOSHA KABUSHIKI KAISHA, Toyota (JP)

(72) Inventor: Shingo Miyai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 428 days.

(21) Appl. No.: 17/950,588

(22) Filed: Sep. 22, 2022

(65) Prior Publication Data

US 2023/0184626 A1 Jun. 15, 2023

(30) Foreign Application Priority Data

Dec. 10, 2021 (JP) .................. 2021-200765

(51) Int. Cl.
| | |
|---|---|
| *G01M 17/007* | (2006.01) |
| *G01M 13/028* | (2019.01) |
| *G06F 3/147* | (2006.01) |
| *G06T 11/20* | (2006.01) |

(52) U.S. Cl.
CPC ........ *G01M 17/007* (2013.01); *G01M 13/028* (2013.01); *G06F 3/147* (2013.01); *G06T 11/206* (2013.01)

(58) Field of Classification Search
CPC ... G01M 17/007; G01M 13/028; G01H 1/003
See application file for complete search history.

(56) References Cited

U.S. PATENT DOCUMENTS

2007/0032968 A1* 2/2007 Nakamura .......... G01M 13/028 702/56
2019/0295567 A1* 9/2019 Sudo ................. G10L 25/51

FOREIGN PATENT DOCUMENTS

JP 2005-098984 A 4/2005

\* cited by examiner

*Primary Examiner* — Stephen D Meier
*Assistant Examiner* — Leo T Hinze
(74) *Attorney, Agent, or Firm* — Dinsmore & Shohl LLP

(57) ABSTRACT

An abnormal noise analysis device includes a first calculation unit that acquires a relationship among time, frequency, and acoustic pressure from data on vehicle-emitted noise and extracts a distinctive frequency from the acquired relationship at predetermined intervals, a second calculation unit that, based on vehicle's specifications and predetermined rotation speed and for each of multiple phenomena each generating an abnormal noise, acquires a relationship between time and frequency of a related rotating element and sets a frequency range that is based on the relationship between time and frequency and that extracts, from the phenomena, the phenomenon having the corresponding frequency range including a relatively long time during which the distinctive frequency occurred, and a display unit that displays the relationship among time, frequency, and acoustic pressure acquired by the first calculation unit, the phenomenon extracted by the second calculation unit, and the frequency range corresponding to the phenomenon.

6 Claims, 3 Drawing Sheets

ABNORMAL NOISE ANALYSIS DEVICE AND METHOD

CROSS-REFERENCE TO RELATED APPLICATION

This application claims priority to Japanese Patent Application No. 2021-200765 filed on Dec. 10, 2021, incorporated herein by reference in its entirety.

BACKGROUND

1. Technical Field

The present disclosure relates to an abnormal noise analysis device and method for analyzing the cause of an abnormal noise generated in a vehicle.

2. Description of Related Art

Conventionally, a noise and vibration analysis device is known that receives and analyzes data on noises or vibrations generated by the rotation of rotating bodies and data on the rotation speed of a selected rotating body when the power transmission mechanism of a vehicle having a plurality of rotating bodies is operating (see, for example, Japanese Unexamined Patent Application Publication No. 2005-98984 (JP 2005-98984 A)). This noise and vibration analysis device frequency-analyzes noise or vibration data and, at the same time, calculates the order according to the specifications of the rotating body from the frequency-analyzed noise or vibration data. In addition, this noise and vibration analysis device causes the display unit to display the acoustic pressure level, calculated from the noise or vibration data, along with its corresponding order and the vehicle speed and reproduces the sound having a specific order selected by the user on the display unit.

SUMMARY

According to the conventional noise and vibration analysis device described above, the graph display using the vehicle speed may easily make it easier to maintain compatibility with a sensory inspection and, in addition, checking the order of noise generation and reproducing the received noise may make it possible to identify a rotating body that is the noise generation source. However, in order to accurately identify a rotating body that is the noise generation source while comparing the order, vehicle speed, and acoustic pressure level, some experience is required for the user of the noise and vibration analysis device. In addition, even if the noise generation source is identified using the above-described noise and vibration analysis device while comparing the order, vehicle speed, and acoustic pressure level, it is difficult to explain the specific evidence to the owner of the vehicle, with the possibility that prompt measures against the abnormal noise cannot be taken.

In view of the foregoing, it is a main object of the present disclosure to present the analysis result of abnormal noise together with its validity to further improve the convenience of the user.

A first aspect of the present disclosure relates to an abnormal noise analysis device that analyzes the cause of an abnormal noise generated in a vehicle based on data on noise emitted from the vehicle and the predetermined rotation speed of the vehicle. The abnormal noise analysis device includes a first calculation unit, a second calculation unit, and a display unit. The first calculation unit is configured to acquire a relationship among time, frequency, and acoustic pressure from the data on noise and to extract a distinctive frequency from the acquired relationship among time, frequency, and acoustic pressure at predetermined time intervals. The second calculation unit is configured, based on specifications of the vehicle and the rotation speed and for each of a plurality of phenomena each of which generates an abnormal noise, to acquire a relationship between time and frequency of a related rotating element and to set a frequency range that is based on the acquired relationship between time and frequency and is configured to extract, from the phenomena, the phenomenon having the corresponding frequency range that includes a relatively long period of time during which the distinctive frequency occurred. The display unit is configured to display the phenomenon extracted by the second calculation unit and to superimpose the frequency range corresponding to the phenomenon, extracted by the second calculation unit, on the relationship among time, frequency, and acoustic pressure acquired by the first calculation unit.

A second aspect of the present disclosure relates to an abnormal noise analysis method that analyzes the cause of an abnormal noise generated in a vehicle based on data on noise emitted from the vehicle and the predetermined rotation speed of the vehicle. The abnormal noise analysis method includes acquiring a relationship among time, frequency, and acoustic pressure from the data on noise and, at the same time, extracting a distinctive frequency from the acquired relationship among time, frequency, and acoustic pressure at predetermined time intervals, acquiring a relationship between time and frequency of a related rotating element and, at the same time, setting a frequency range that is based on the acquired relationship between time and frequency, based on the specifications of the vehicle and the rotation speed and for each of a plurality of phenomena each of which generates an abnormal noise, extracting, from the phenomena, the phenomenon having the corresponding frequency range that includes a relatively long period of time during which the distinctive frequency occurred, and causing a display unit to display the extracted phenomenon and, at the same time, causing the display unit to display the relationship among time, frequency, and acoustic pressure and the frequency range corresponding to the extracted phenomenon in a superimposed mode.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, a mode for carrying out the disclosure of the present disclosure will be described with reference to the drawings.

Figure 1:
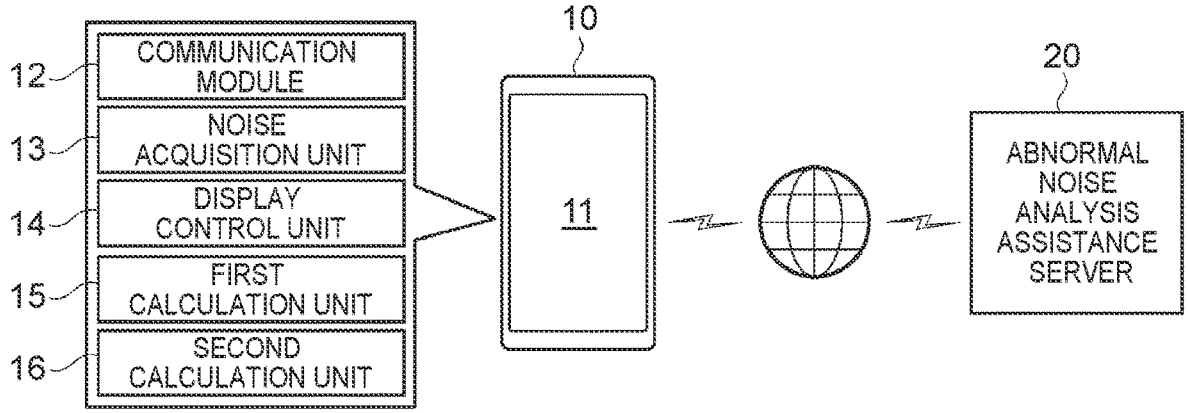
FIG. 1 is a schematic configuration diagram showing an abnormal noise analysis device of the present disclosure.

FIG. 1 is a schematic configuration diagram showing a mobile terminal 10 that works as an abnormal noise analysis device of the present disclosure. The mobile terminal 10 shown in the figure is used for analyzing the cause of abnormal noise generated in a vehicle (mainly in the drive system) (not shown), for example, in a vehicle dealer and a maintenance shop. In this embodiment, the mobile terminal 10 is a smartphone including components such as a system-on-chip SoC (including a CPU and a GPU), a ROM, a RAM, a display unit 11, a communication module 12, and a microphone (not shown). In the mobile terminal 10, an abnormal noise analysis application (program) is installed. The mobile terminal 10 includes a noise acquisition unit 13, a display control unit 14, a first calculation unit 15, and a second calculation unit 16 each of which is constructed by cooperation between the abnormal sound analysis application (software) and the hardware such as the SoC, ROM, RAM, and microphone.

The display unit 11 of the mobile terminal 10 includes a panel such as a liquid crystal panel and an organic EL panel. The communication module 12 can exchange various types of information with the electronic control unit of the vehicle via short-range wireless communication or a cable and, at the same time, can exchange various types of information with an abnormal noise analysis assistance server (abnormal noise analysis assistance device) 20 via a network such as the Internet. The noise acquisition unit 13 is constructed by cooperation between the abnormal noise analysis application and the components, such as an SoC, a ROM, a RAM, and a microphone, for acquiring the time-axis data on noise (acoustic pressure). The display control unit 14 is constructed by cooperation between the abnormal noise analysis application and the components, such as an SoC, a ROM, and a RAM, for controlling the display unit 11. The first and second arithmetic units 15 and 16 are each constructed by cooperation between the abnormal noise analysis application and the components such as an SoC, a ROM, and a RAM.

The abnormal noise analysis assistance server 20, a computer including components such as a CPU, a ROM, a RAM, and input/output devices, is installed and managed in this embodiment, for example, by an automobile manufacturer that manufactures the vehicle described above. In the abnormal noise analysis assistance server 20, an analysis assistance module, which assists in the analysis of abnormal noise generated in a vehicle, is constructed by cooperation between hardware components, such as a CPU, a ROM, and a RAM, and various pre-installed programs. In addition, the abnormal noise analysis assistance server 20 includes a storage device that stores a database storing, for each vehicle type, the information necessary for analyzing abnormal noise generated in a vehicle. For each vehicle type, the database stores the specifications of the vehicle and each of the in-vehicle devices as well as the frequency (resonance frequency) of a resonance phenomenon that is known to generate abnormal noise (for example, the resonance of the shaft).

Next, an abnormal noise analysis procedure performed by the mobile terminal 10, which is the abnormal noise analysis device, will be described below with reference to FIG. 2 to FIG. 5.

Figure 2:
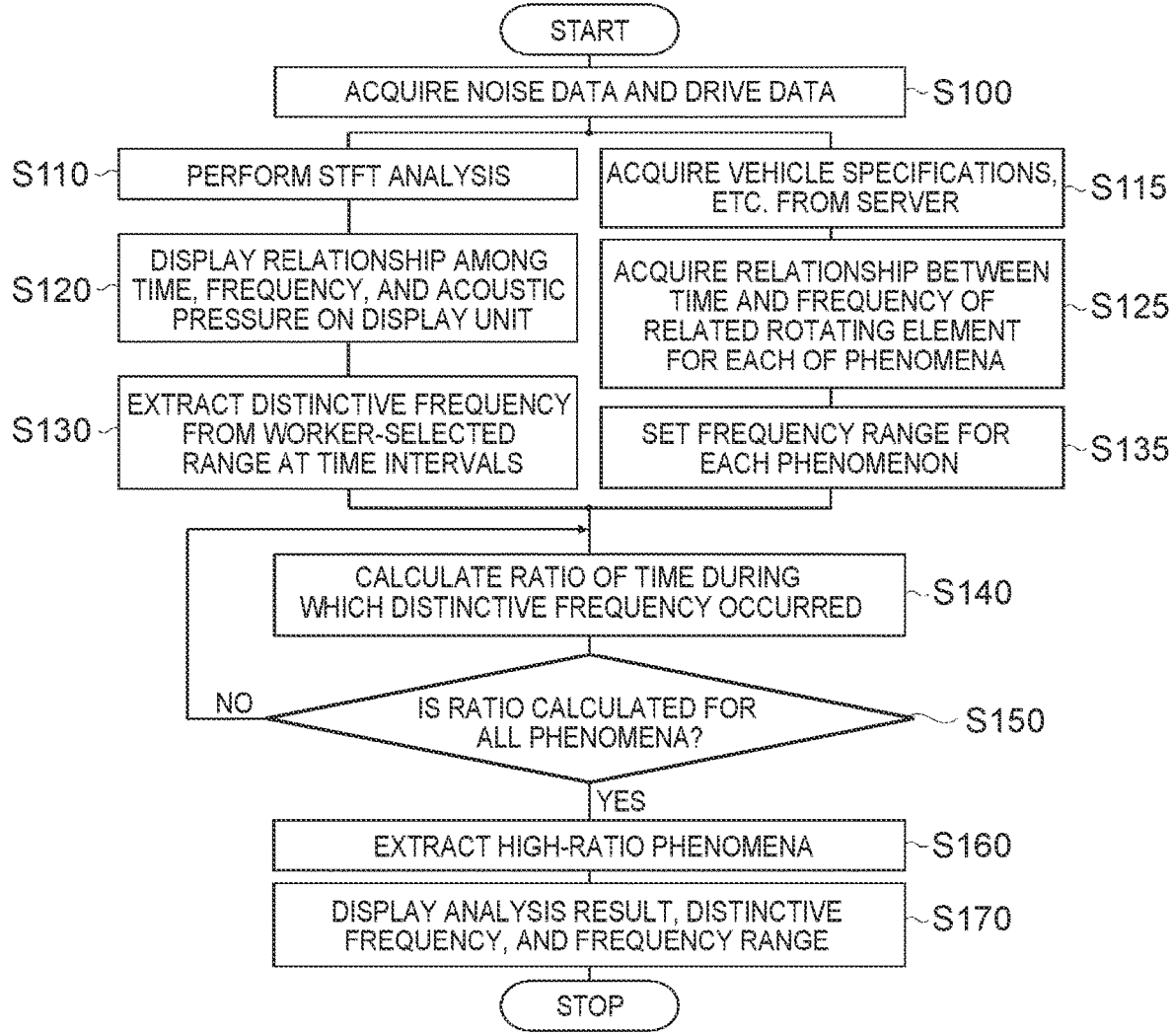
FIG. 2 is a flowchart showing a procedure for analyzing abnormal noise by the abnormal noise analysis device of the present disclosure.

FIG. 2 is a flowchart showing the abnormal noise analysis procedure performed by the mobile terminal 10. When analyzing an abnormal noise, a worker (user) who uses the mobile terminal 10 (abnormal noise analysis device) activates the abnormal noise analysis application described above and, at the same time, connects the mobile terminal 10 to the electronic control unit of a target vehicle. The electronic control unit of the target vehicle and the mobile terminal 10 may be connected by short-range wireless communication or may be connected via a cable. The mobile terminal 10 acquires the vehicle information, such as the chassis number or vehicle identification number of the target vehicle, from the electronic control unit. Note that the vehicle information may also be entered into the mobile terminal 10 by the worker.

Next, the worker taps the measurement start button, displayed on the display unit 11, to drive (operate) the target vehicle on a roadway or on a test stand for reproducing the driving state in which an abnormal noise, which was reported from the owner of the target vehicle, is generated. As shown in FIG. 2, while the target vehicle is driving, the communication module 12 acquires predetermined drive data (operation data) from the electronic control unit of the target vehicle at predetermined time intervals (micro-time), and the noise acquisition unit 13 of the mobile terminal 10 acquires the time-axis data on noise emitted from the target vehicle in synchronization with the acquisition of the drive data (step S100). The drive data, acquired from the target vehicle in step S100, includes a predetermined rotation speed and vehicle speed. The predetermined rotation speed is the rotation speed of the engine, the input rotation speed and output rotation speed of the transmission, etc. when the target vehicle is equipped with an engine (internal combustion engine), and is the rotation speed of the electric motor, the rotation speed of the drive shaft, etc. when the target vehicle is a hybrid electric vehicle or a battery electric vehicle. The communication module 12 and the noise acquisition unit 13 acquire the drive data or the time-axis data on noise, respectively, until the measurement end button, displayed on the display unit 11, is tapped by the worker, for example, when the target vehicle is stopped.

Figure 3:
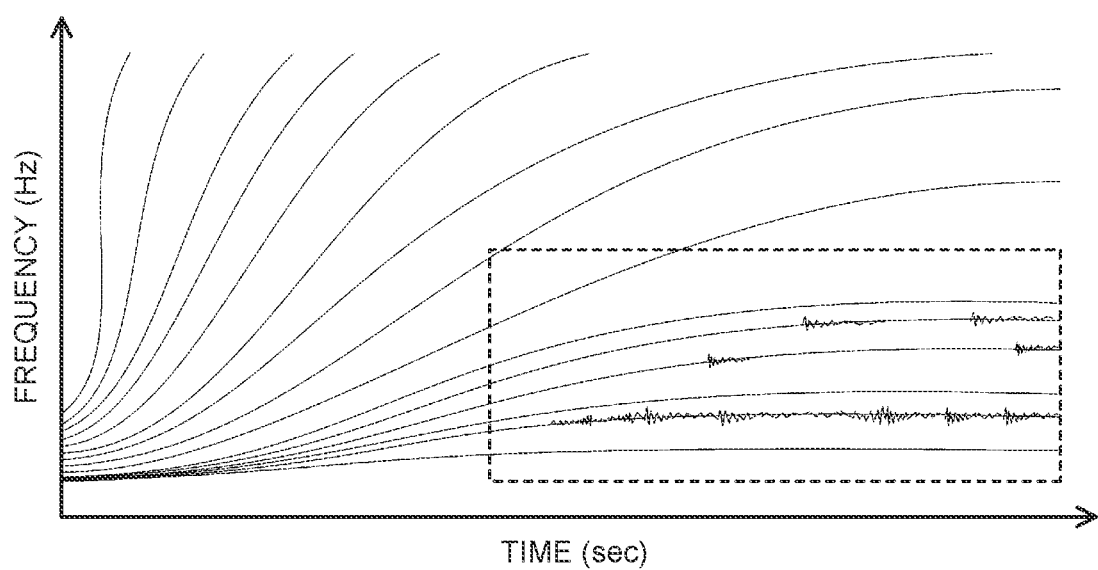
FIG. 3 is a diagram showing an example of display content displayed on a display unit of the abnormal noise analysis device of the present disclosure.
Figure 4:
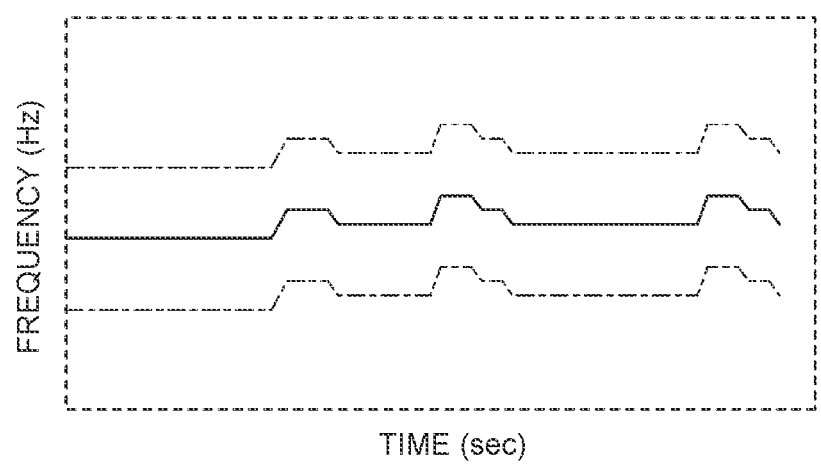
FIG. 4 is a diagram showing an example of the frequency range used for the analysis of abnormal noise by the abnormal noise analysis device of the present disclosure.

After the processing in step S100, the first calculation unit 15 of the mobile terminal 10 applies the Short-Time Fourier Transform (STFT) to the time-axis data on noise, acquired by the noise acquisition unit 13, to acquire a spectrogram (acoustic spectrogram) that indicates the relationship among time, frequency, and acoustic pressure (step S110). The display control unit 14 of the mobile terminal 10 causes the display unit 11 to display the spectrogram, acquired by the first calculation unit 15, as shown in FIG. 3 (step S120). In step S120, the display control unit 14 causes the display unit 11 to display the spectrogram (color map) in which the acoustic pressure level is color-coded with the horizontal axis as the time axis and the vertical axis as the frequency axis.

When the spectrogram is displayed on the display unit 11 of the mobile terminal 10, the worker who in the cabin of the stopped vehicle or in the vehicle dealer selects a range of time and frequency (see dashed line in FIG. 3) to be analyzed by the mobile terminal 10, which works as the abnormal noise analysis device, from the spectrogram displayed on the display unit 11 based mainly on the color-coded acoustic pressure level. When a range of time and frequency is selected by the worker, the first calculation unit 15 of the mobile terminal 10 extracts a distinctive frequency fc from the range of time and frequency, selected by the worker, on the spectrogram at predetermined time intervals (every predetermined time) (step S130). In this embodiment, as the distinctive frequency fc, the first calculation unit 15 extracts a frequency at which the acoustic pressure is maximized at each predetermined time.

On the other hand, the second calculation unit 16 of the mobile terminal 10 performs the processing in steps S115, S125, and S135 in FIG. 2 in parallel with the processing in steps S110 to S130 described above. That is, in step S115, the second calculation unit 16 sends the vehicle information (chassis number or vehicle identification number) on the target vehicle, which was acquired before the acquisition of data such as the time-axis data on noise, to the abnormal noise analysis assistance server 20 and, from the abnormal noise analysis assistance server 20, acquires the information necessary for analyzing an abnormal noise generated in the target vehicle. The information acquired in step S115 includes the specifications of various rotating elements each related to a phenomenon that generates an abnormal noise in the target vehicle (for example, the number of gear teeth), the specifications for calculating the rotation speed of each rotating element (gear ratio of gear mechanism, tire diameter, etc.), the resonance frequency of a resonance phenomenon that generates an abnormal noise, etc.

After the processing in step S115, for each of a plurality of phenomena registered in advance as the phenomena that may generate an abnormal noise in the target vehicle, the second calculation unit 16 acquires the relationship (order component) between time and frequency of one rotating element, predetermined as related to the each phenomenon, based on the vehicle speed and the rotation speed acquired in step S100 and the specifications of the target vehicle acquired from the abnormal noise analysis assistance server 20 (step S125). For example, when one rotating element described above is a gear, the second calculation unit 16 calculates, in step S125, the product of the three values (rotation speed of the drive source such as an engine or a motor, gear ratio from the drive source to the gear, and number of teeth (order) of the gear) to calculate the frequency of the one rotating element for each target time. Note that the frequency of a rotating element may also be calculated from the vehicle speed, the tire diameter, the gear ratio, etc.

In addition, within the time range selected by the worker on the spectrogram displayed on the display unit 11 and for each of the phenomena described above, the second calculation unit 16 sets a frequency range Rc that is based on the relationship between time and frequency of the rotating element associated with each phenomenon (step S135). In this embodiment, the frequency range Rc that is set for each phenomenon is the range between the two alternate long and short dash lines shown in FIG. 4. This range is set, within the time range selected by the worker, by adding and subtracting a predetermined value to and from the frequency (see the solid line in FIG. 4) at each time of the rotating element related to the phenomenon. When the resonance frequency of a resonance phenomenon is provided from the abnormal noise analysis assistance server 20 in step S135, the second calculation unit 16 sets the frequency range Rc that is based on the resonance frequency (resonance frequency ±α).

When the processing in steps S110 to S130 performed by the first calculation unit 15 is completed and when the processing in steps S115 to S135 performed by the second calculation unit 16 is completed, the second calculation unit 16 calculates, for each of the phenomena described above, the ratio γ of the time during which the above-described distinctive frequency fc occurred to the range of time of the frequency range Rc that is set for each phenomenon, that is, the range of time selected by the worker (step S140). When the ratio γ is calculated for one phenomenon, the second calculation unit 16 determines whether the ratio γ is calculated for all the pre-registered phenomena (step S150). When it is determined that the ratio γ is not calculated for all the phenomena (step S150: NO), the second calculation unit 16 calculates the ratio γ of the time during which the distinctive frequency fc occurred for the next phenomenon (step S140).

When it is determined that the ratio γ described above has been calculated for all the phenomena (step S150: YES), the second calculation unit 16 extracts a predetermined number (for example, the top three) of phenomena each with the ratio γ that was calculated in step S140 and is equal to or greater than a predetermined value (for example, 80%) (step S160). When a predetermined number of phenomena satisfying the condition are not found in step S160, the second calculation unit 16 extracts the phenomenon with the largest ratio γ from the phenomena. After the processing in step S160, the display control unit 14 causes the display unit 11 to display the analysis result of abnormal noise (step S170) and ends the series of processing shown in FIG. 2.

Figure 5:
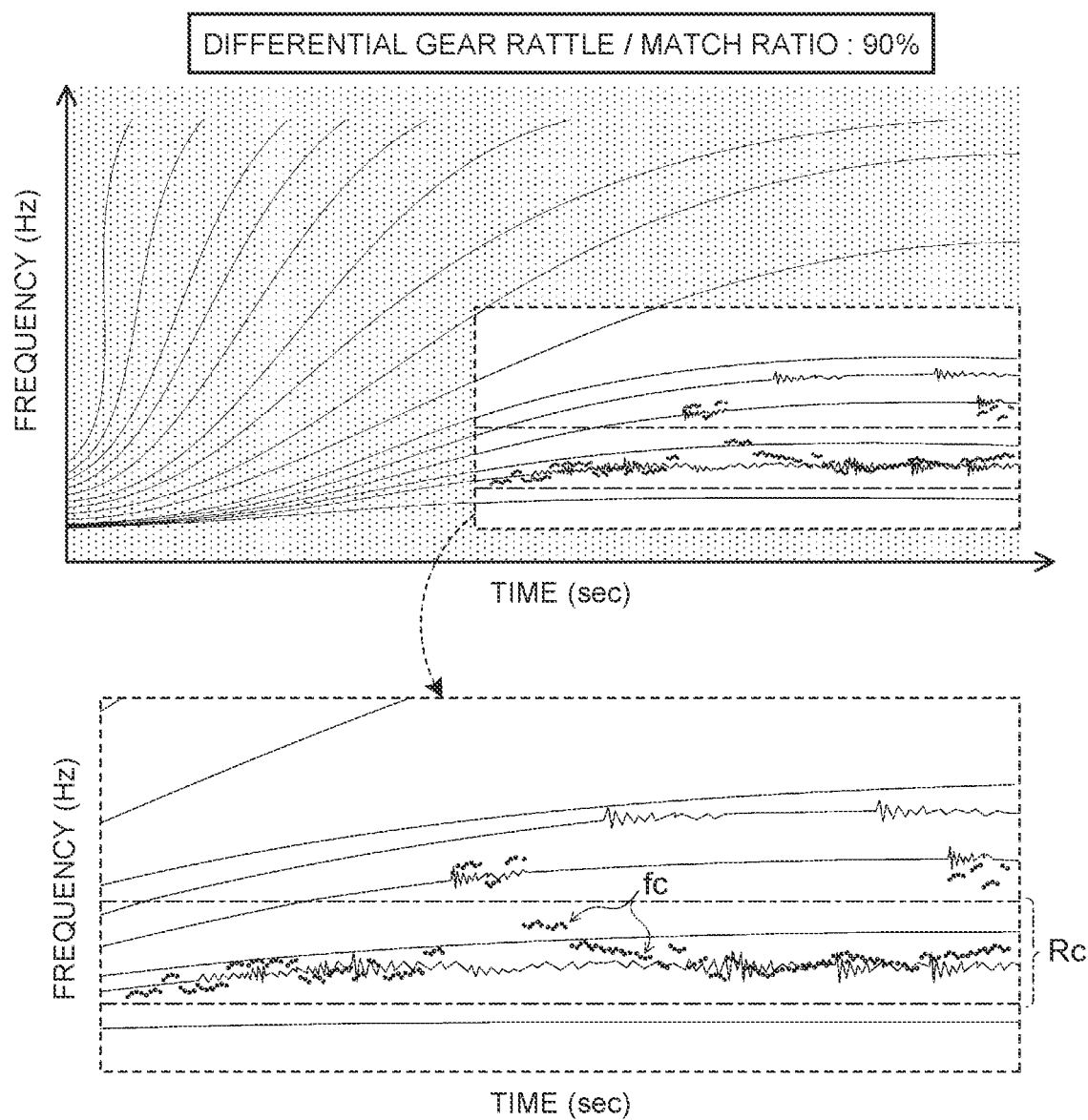
FIG. 5 is a diagram showing an example of display content displayed on the display unit of the abnormal noise analysis device of the present disclosure.

In step S170, as shown in FIG. 5, the display control unit 14 causes the display unit 11 to display (1) the phenomenon extracted by the second calculation unit 16 ("Differential Gear Rattle" in the example in FIGS. 5) and (2) the ratio γ, calculated in step S140, that indicates the match ratio between the extracted phenomenon and the phenomena actually generated in the target vehicle ("90%" in the example in FIG. 5), as the analysis result of abnormal noise. In addition, in step S170, the display control unit 14 causes the display unit 11 to superimpose the distinctive frequencies fc (see the black circles in FIG. 5), which are extracted by the first calculation unit 15, and the frequency range Rc (see the alternate long and short dash line in FIG. 5), which is set by the second calculation unit 16 for the phenomenon extracted in step S160, on the already displayed spectrogram (relationship among time, frequency and acoustic pressure). Note that the range included in the spectrogram but not selected by the worker is grayed out (see the shaded area in FIG. 5).

When a plurality of phenomena each with the ratio γ equal to or greater than the predetermined value is extracted, the information about the phenomenon with the largest ratio γ (high match ratio) is displayed first on the display unit 11 and, by tapping the predetermined button, the information about other phenomena can be displayed on the display unit 11. In this embodiment, when the ratio γ is less than a predetermined lower limit value (for example, 50%), the message indicating that the cause of abnormal noise is unknown is displayed on the display unit 11.

As described above, the first calculation unit 15 of the mobile terminal 10, which is the abnormal noise analysis device, performs the STFT analysis for the time-axis data on noise emitted from the target vehicle to acquire a plurality of spectrograms, each of which indicates the relationship among time, frequency, and acoustic pressure, and, at the same time, extracts a distinctive frequency fc from the acquired spectrograms at predetermined time intervals (steps S110 to S130). On the other hand, based on the specifications and the rotation speed (drive data) of the target vehicle and for each of a plurality of phenomena registered in advance as those that may generate an abnormal noise, the second calculation unit 16 acquires the relationship between time and frequency of a related rotating element and, at the same time, sets the frequency range Rc that is based on the relationship between time and frequency of the rotating element (steps S115-S135). In addition, from the phenomena, the second calculation unit 16 extracts a phenomenon having a corresponding frequency range Rc that includes a relatively long period of time during which the distinctive frequency fc occurred (steps S140 to S160).

Then, as shown in FIG. 5, the phenomenon extracted by the second calculation unit 16 is displayed on the display unit 11 of the mobile terminal 10 and, at the same time, the frequency range Rc corresponding to the phenomenon, extracted by the second calculation unit 16, is superimposed on the spectrogram acquired by the first calculation unit 15 (step S170). This display allows the worker (user) to acquire the phenomenon, displayed on the display unit 11, as the analysis result of the abnormal noise generated in the target vehicle and to confirm the validity of the analysis result by the frequency range Rc superimposed on the spectrogram. As a result, presenting the analysis result of the abnormal noise together with its validity in this way further improves the convenience of the worker, making it possible for the worker to accurately explain the analysis result to the owner of the target vehicle and to take prompt measures against the abnormal noise.

The distinctive frequency fc, extracted by the first calculation unit 15, is superimposed (plotted) on the spectrogram, acquired by the first calculation unit 15, on the display unit 11 of the mobile terminal 10 (see FIG. 5). This makes it possible to confirm the validity of the analysis result of the abnormal noise more easily, further improving the convenience of the worker.

In addition, the first calculation unit 15 extracts a distinctive frequency fc from the range of time and frequency, which is included in the spectrogram displayed on the display unit 11 and is selected by the worker, at predetermined time intervals (step S130). The second calculation unit 16 sets the frequency range Rc for each of a plurality of phenomena within the time range selected by the worker (step S135) and, from the phenomena, extracts at least a phenomenon having the corresponding frequency range Rc that includes the longest period of time during which the distinctive frequency fc occurred (the phenomenon having the largest ratio γ) (steps S140 to S160). This makes it possible to reduce the calculation load of the first calculation unit 15 and the second calculation unit 16. In addition, superimposing the frequency range Rc, which is set for confirming the validity of the analysis result of the abnormal noise, on the range of time and frequency, which is included in the spectrogram and is selected by worker, allows the worker to confirm not only the validity of the analysis result based on the frequency range Rc but also the validity of the range selected by the worker himself or herself. This means that the repeated use of the mobile terminal 10, which is the abnormal noise analysis device, allows the user to more appropriately select a range of time and frequency to be analyzed.

The second calculation unit 16 calculates the ratio γ of the period of time during which the distinctive frequency fc occurred to the range of time selected by the worker (step S140). On the display unit 11, the ratio γ for the phenomenon, extracted by the second calculation unit 16, is displayed as the match ratio (step S170). This makes it possible to confirm the validity of the analysis result of the abnormal noise more easily, further improving the convenience of the worker.

Although the first calculation unit 15 extracts a frequency having the maximum acoustic pressure from the spectrogram as the distinctive frequency fc at predetermined time intervals, the distinctive frequency fc is not limited to the frequency having the maximum acoustic pressure but may be a frequency that is extracted, for example, by machine learning. Furthermore, the processing in steps S110 to S130 and S115 to S135 may be performed by a single calculation unit, and the processing in S115 to S135 may be performed before or after the processing in S110 to S130. In addition, though installed in the mobile terminal 10 in the above description, the abnormal noise analysis application (program) may be installed in a tablet terminal, a laptop personal computer, or in a desktop personal computer, in which case, the tablet terminal, etc., may function as the abnormal noise analysis device. When a desktop personal computer is used as the abnormal noise analysis device, the time-axis data on noise and the drive data may be acquired from the target vehicle, for example, via a smartphone, and then the acquired data may be transferred to the personal computer from the smartphone.

As described above, the abnormal noise analysis device of the present disclosure is an abnormal noise analysis device that analyzes the cause of an abnormal noise generated in a vehicle based on data on noise emitted from the vehicle and the predetermined rotation speed of the vehicle. The abnormal noise analysis device includes the first calculation unit configured to acquire a relationship among time, frequency, and acoustic pressure from the data on noise and to extract a distinctive frequency from the acquired relationship among time, frequency, and acoustic pressure at predetermined time intervals, the second calculation unit configured, based on the specifications of the vehicle and the rotation speed and for each of a plurality of phenomena each of which generates an abnormal noise, to acquire a relationship between time and frequency of a related rotating element and to set a frequency range that is based on the acquired relationship between time and frequency and configured to extract, from the phenomena, the phenomenon having the corresponding frequency range that includes a relatively long period of time during which the distinctive frequency occurred, and a display unit configured to display the phenomenon extracted by the second calculation unit and to superimpose the frequency range corresponding to the phenomenon extracted by the second calculation unit on the relationship among time, frequency, and acoustic pressure acquired by the first calculation unit.

The first calculation unit of the abnormal noise analysis device of the present disclosure is configured to acquire a relationship among time, frequency, and acoustic pressure from the data on noise emitted from the vehicle and to extract a distinctive frequency from the acquired relationship among time, frequency, and acoustic pressure at predetermined time intervals. The second calculation unit is configured, based on the specifications of the vehicle and the rotation speed and for each of a plurality of phenomena each of which generates an abnormal noise, to acquire a relationship between time and frequency of a related rotating element and to set a frequency range that is based on the acquired relationship between time and frequency. In addition, the second calculation unit is configured to extract, from the phenomena, the phenomenon having the corresponding frequency range that includes a relatively long period of time during which the distinctive frequency occurred. Then, the display unit is configured to display the phenomenon extracted by the second calculation unit and to superimpose the frequency range corresponding to the phenomenon extracted by the second calculation unit on the relationship among time, frequency, and acoustic pressure acquired by the first calculation unit. This display allows the user of the abnormal noise analysis device to acquire the phenomenon, displayed on the display unit, as the analysis result of the abnormal noise generated in the vehicle, and to confirm the validity of the analysis result based on the frequency range superimposed on the relationship among time, frequency, and acoustic pressure. As a result, presenting the analysis result of the abnormal noise together with its validity in this way makes it possible to further improve the convenience of the user.

The display unit may be configured to superimpose the distinctive frequency extracted by the first calculation unit on the relationship among time, frequency, and acoustic pressure acquired by the first calculation unit. This allows the user to confirm the validity of the analysis result of the abnormal noise more easily, further improving the convenience of the user.

In addition, the first calculation unit may be configured to extract the distinctive frequency from a user-selected range of time and frequency at the predetermined time intervals. The user-selected range of time and frequency is included in the relationship among time, frequency, and acoustic pressure displayed on the display unit. The second calculation unit may be configured to set the frequency range for each of the phenomena within the user-selected range of time and to extract, from the phenomena, at least the phenomenon having the corresponding frequency range that includes the longest period of time during which the distinctive frequency occurred. This makes it possible to reduce the calculation load of the first calculation unit and the second calculation unit. In addition, in this mode, superimposing the frequency range, which is set for confirming the validity of the analysis result of the abnormal noise, on the user-selected range of time and frequency allows the user to confirm not only the validity of the analysis result based on the frequency range but also the validity of the range selected by the user himself or herself. This means that the repeated use of the abnormal noise analysis device allows the user to more appropriately select a range of target time and frequency to be analyzed.

The second calculation unit may be configured to calculate, for each of the phenomena, a ratio γ of time during which the distinctive frequency occurred to the user-selected range of time, and the display unit may be configured to display the ratio for the phenomenon extracted by the second calculation unit. This makes it possible to confirm the validity of the analysis result of the abnormal noise more easily, further improving the convenience of the user.

In addition, the first calculation unit may be configured to extract, as the distinctive frequency, a frequency at which the acoustic pressure is maximum from the relationship among time, frequency, and acoustic pressure at the predetermined time intervals.

The abnormal noise analysis method of the present disclosure is an abnormal noise analysis method that analyzes the cause of an abnormal noise generated in a vehicle based on data on noise emitted from the vehicle and the predetermined rotation speed of the vehicle. The abnormal noise analysis method includes acquiring a relationship among time, frequency, and acoustic pressure from the data on noise and, at the same time, extracting a distinctive frequency from the acquired relationship among time, frequency, and acoustic pressure at predetermined time intervals, acquiring a relationship between time and frequency of a related rotating element and, at the same time, setting a frequency range that is based on the acquired relationship between time and frequency, based on specifications of the vehicle and the rotation speed and for each of a plurality of phenomena each of which generates an abnormal noise, extracting, from the phenomena, the phenomenon having the corresponding frequency range that includes a relatively long period of time during which the distinctive frequency occurred, and causing a display unit to display the extracted phenomenon and, at the same time, causing the display unit to display the relationship among time, frequency, and acoustic pressure and the frequency range corresponding to the extracted phenomenon in a superimposed mode.

This method presents the analysis result of the abnormal noise together with its validity, making it possible to further improve the convenience of the user.

It is to be understood that the present disclosure is not limited to the above embodiment and that various changes can be made within the general scope of the present disclosure. In addition, the above embodiment is merely a specific form of the disclosure described in Summary, and does not limit the elements of the disclosure described in Summary.

The present disclosure is extremely useful for the analysis of an abnormal noise generated in a vehicle.

What is claimed is:

1. An abnormal noise analysis mobile terminal that analyzes a cause of an abnormal noise generated in a vehicle based on data on noise emitted from the vehicle and a predetermined rotation speed of the vehicle, the abnormal noise analysis mobile terminal comprising:
    a central processing unit configured to:
        activate an abnormal noise analysis application including instructions for execution on the abnormal noise analysis mobile terminal;
        connect the abnormal noise analysis mobile terminal to an electronic control unit of the vehicle in response to activating the abnormal noise analysis application;
        receive a selection of a button on a display panel that causes operation of the vehicle;
        operate, in response to the selection, the vehicle to reproduce a driving state in which the abnormal noise is generated;
        in response to operating the vehicle to reproduce the driving state in which the abnormal noise is generated, acquire a relationship among time, frequency, and acoustic pressure from the data on noise and to extract a distinctive frequency from the acquired relationship among time, frequency, and acoustic pressure at predetermined time intervals;
        based on specifications of the vehicle and the rotation speed and for each of a plurality of phenomena each of which generates an abnormal noise, to acquire a relationship between time and frequency of a related rotating element and to set a frequency range that is based on the acquired relationship between time and frequency and configured to extract, from the phenomena, the phenomenon having the corresponding frequency range that includes a relatively long period of time during which the distinctive frequency occurred; and
    the display panel configured to display the phenomenon extracted by the central processing unit and to superimpose the frequency range corresponding to the phenomenon extracted by the central processing unit on the relationship among time, frequency, and acoustic pressure acquired by the central processing unit.

2. The abnormal noise analysis mobile terminal according to claim 1, wherein the display panel is configured to superimpose the distinctive frequency extracted by the central processing unit on the relationship among time, frequency, and acoustic pressure acquired by the central processing unit.

3. The abnormal noise analysis mobile terminal according to claim 1, wherein the central processing unit is configured to:
   control the display panel to display a spectrogram that is color coded and includes the acoustic pressure;
   receive a user selection of a window of a range of time and frequency of the color coded acoustic pressure displayed on the display panel;
   extract the distinctive frequency from the user-selected range of time and frequency at the predetermined time intervals that are also user-selected, the user-selected range of time and frequency being included in the relationship among time, frequency, and acoustic pressure displayed on the display panel; and
   set, in response to and in accordance with the user selection of the window of the range of time and frequency of the color coded acoustic pressure displayed on the display panel, the frequency range for each of the phenomena within the user-selected range of time and to extract, from the phenomena, at least the phenomenon having the corresponding frequency range that includes a longest period of time during which the distinctive frequency occurred.

4. The abnormal noise analysis mobile terminal according to claim 3, wherein:
   for each of the phenomena, the central processing unit is configured to calculate a ratio of time during which the distinctive frequency occurred to the user-selected range of time; and
   the display panel is configured to display the ratio for the phenomenon extracted by the central processing unit.

5. The abnormal noise analysis mobile terminal according to claim 1, wherein the central processing unit is configured to extract, as the distinctive frequency, a frequency at which the acoustic pressure is maximum from the relationship among time, frequency, and acoustic pressure at the predetermined time intervals.

6. An abnormal noise analysis method that analyzes a cause of an abnormal noise generated in a vehicle based on data on noise emitted from the vehicle and a predetermined rotation speed of the vehicle, the abnormal noise analysis method comprising:
   activating an abnormal noise analysis application including instructions for execution on a mobile terminal;
   connecting the mobile terminal to an electronic control unit of the vehicle in response to activating the abnormal noise analysis application;
   receiving a selection of a button on a display panel that causes operation the vehicle;
   operating, in response to the selection, the vehicle to reproduce a driving state in which the abnormal noise is generated;
   in response to operating the vehicle to reproduce the driving state in which the abnormal noise is generated, acquiring a relationship among time, frequency, and acoustic pressure from the data on noise and, at the same time, extracting a distinctive frequency from the acquired relationship among time, frequency, and acoustic pressure at predetermined time intervals;
   acquiring a relationship between time and frequency of a related rotating element and, at the same time, setting a frequency range that is based on the acquired relationship between time and frequency, based on specifications of the vehicle and the rotation speed and for each of a plurality of phenomena each of which generates an abnormal noise;
   extracting, from the phenomena, the phenomenon having the corresponding frequency range that includes a relatively long period of time during which the distinctive frequency occurred; and
   causing a display panel to display the extracted phenomenon and, at the same time, causing the display panel to display the relationship among time, frequency, and acoustic pressure and the frequency range corresponding to the extracted phenomenon in a superimposed mode.

* * * * *